F. SLONOWSKI.
TROLLEY.
APPLICATION FILED APR. 17, 1912.
1,042,162.
Patented Oct. 22, 1912.
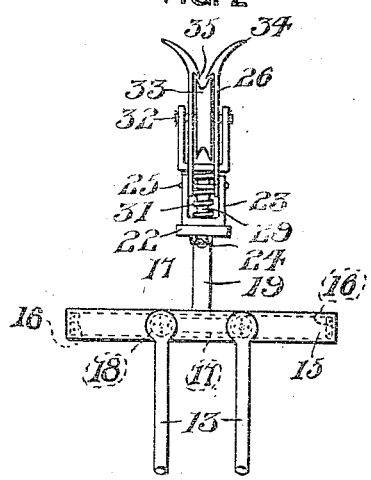
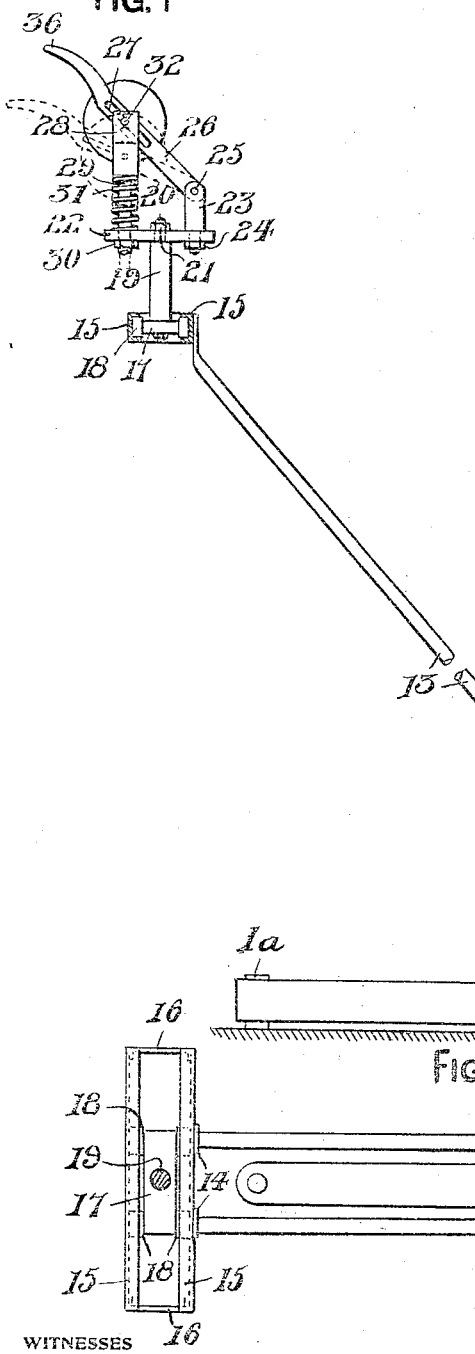
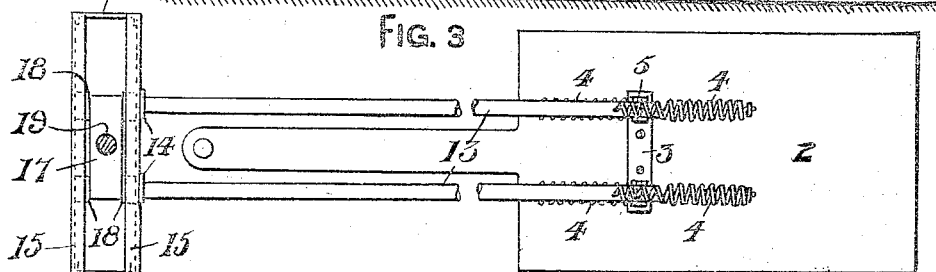
WITNESSES
INVENTOR
F. Slonowski
BY
ATTORNEYS

UNITED STATES PATENT OFFICE.

FRANK SLONOWSKI, OF MARIANNA, PENNSYLVANIA.

TROLLEY.

1,042,162.  Specification of Letters Patent.  Patented Oct. 22, 1912.

Application filed April 17, 1912. Serial No. 691,313.

*To all whom it may concern:*

Be it known that I, FRANK SLONOWSKI, residing at Marianna, in the State of Pennsylvania, have invented certain new and useful Improvements in Trolleys, of which the following is a specification, reference being had therein to the accompanying drawing.

This invention relates to trolleys, and the primary object of my invention is the provision of simple and effective means in connection with a trolley pole, to permit said pole and the harp thereof to readily adjust themselves to a trolley wire, particularly a curved section thereof.

Another object of this invention is to furnish a trolley pole with positive and reliable means for preventing accidental displacement of a trolley wheel relatively to a trolley wire.

A further object of this invention is to provide a strong and durable trolley pole and a harp shiftable relatively to said pole to compensate for inequalities between a track over which a car passes and the trolley wire located above the track.

With the above and other objects in view the invention resides in the novel construction, combination and arrangement of parts to be hereinafter specifically described and then claimed.

Reference will now be had to the drawing, wherein:—

Figure 1 is a side elevation of a trolley in accordance with this invention. Fig. 2 is a front elevation of a portion of the trolley pole partly broken away, and Fig. 3 is a plan of the trolley pole partly broken away.

The reference numeral 1 denotes the top of a car or other vehicle and swiveled upon the top of the car by a pin 1ª is a base plate 2. The base plate 2 has the outer end thereof enlarged and provided with posts 3. Pivotally connected to the upper ends of the posts 3 by pins 5 or other fastening means are the lower ends of parallel angularly disposed poles 13. Connected to the lower ends of the poles 13 are coiled springs 4 that are also connected to the base plate 2, said springs yieldably holding the poles 13 in an angularly disposed position. The poles have the upper ends thereof secured, as at 14 to the front side of a set of transverse channel-bars 15. The channel bars 15 are arranged in parallelism and are connected by end plates 16.

The reference numeral 17 denotes a shiftable carrier arranged between the bars 15 and provided with revoluble rollers or wheels 18 which engage the flanges of said bars, the flanges of said bars serving as a track for the rollers or wheels 18.

Mounted centrally of the carrier 17 is a post 19 having the upper end thereof reduced, as at 20. Movably mounted upon the reduced end of the post 19 and retained thereon by a nut 21 is a harp plate 22. At the forward end of the plate 22 is a yoke-shaped bearing 23 that is retained thereon by a nut 24. Pivotally connected to the bearing 23 by a transverse pin 25 are parallel arms 26 having longitudinal slots 27.

The reference numeral 28 denotes a harp having a stem 29 movably mounted in the rear end of the harp plate 22 and retained therein by a nut 30. Encircling the stem 29, between the harp 28 and the plate 22, is a coiled compression spring 31 that retains the harp 28 normally elevated. The harp 28 has a journal pin 32 extending through the slots 27 of the arms 26, said journal pin supporting a trolley wheel 33 between the arms 26. The trolley wheel 33 is of the ordinary and well known type, and the upper ends of the arms 26 are shaped to extend over the groove of said trolley wheel. By reference to Fig. 2, it will be observed that the upper ends of the arms 26 are bent outwardly, as at 34 to provide a wide entrance for a trolley wire and that the confronting ends of the arms have lips 35 extending over the trolley wheel to prevent accidental displacement of a trolley wire. In side elevation, the upper ends of the arms 26 are curved, as at 36 whereby said arms can readily ride under a switch frog, guard rail or other overhead construction, without injury to the same.

When the trolley is in use, the coiled compression spring 31 is under tension and the arms 27 are in a lowered position, but should the trolley wheel become displaced relatively to a wire, the coiled spring 31 immediately elevates the arms and retains the harp in proximity to the wire.

Since the harp plate 22 is swiveled upon the post 19 and said post movably supported by the carrier 17, the harp plate 22 can adjust itself to correctly position the trolley wheel 33, particularly when passing over a curved section of trolley wire. With the lower ends of the trolley poles 13 movably supported, said trolley poles can yield when irregularities are encountered in a trolley wire.

What I claim is:—

1. In a trolley, the combination with a base plate, and parallel poles having the lower ends thereof yieldably supported by said base plate, of parallel channel bars carried by the upper ends of said poles, a carrier movably mounted between said channel bars, a post supported by said carrier, a harp plate swiveled upon the upper end of said post, a harp movably supported by the rear end of said harp plate, a journal pin carried by said harp and revolubly supporting a trolley wheel, and arms having the lower ends thereof pivotally supported by the front end of said harp plate and the upper ends thereof shaped to extend over said trolley wheel.

2. In a trolley, the combination with a base, and parallel trolley poles having the lower ends thereof yieldably supported by said base, of a carrier movably supported by the upper ends of said poles, a harp plate swiveled above said carrier, a harp movably supported by the rear end of said harp plate, a trolley wheel revolubly mounted in said harp, and arms having the lower ends thereof pivotally supported at the forward end of said harp plate and the upper ends thereof shaped to extend over said trolley wheel.

3. In a trolley, the combination with a base, and parallel poles having the lower ends thereof yieldably supported by said base, of parallel channel bars carried by the upper ends of said poles, a carrier movably mounted between said bars, a post secured to said carrier, a harp plate swiveled upon the end of said post, a spring supported harp arranged in the rear end of said plate, a journal pin arranged in said harp and revolubly supporting a trolley wheel, a bearing carried by the forward ends of said harp plate, and slotted arms held by said journal pin and having the lower ends thereof pivotally connected to said bearing and the upper ends thereof shaped to extend over the trolley wheel of said harp.

In testimony whereof I affix my signature in the presence of two witnesses.

FRANK SLONOWSKI.

Witnesses:
 Max H. Srolovitz,
 K. H. Butler.

---

Copies of this patent may be obtained for five cents each, by addressing the "Commissioner of Patents, Washington, D. C."